United States Patent
Lee et al.

(10) Patent No.: US 8,564,493 B2
(45) Date of Patent: Oct. 22, 2013

(54) Y-TYPE HEXAGONAL FERRITE, FABRICATION METHOD THEREOF, AND ANTENNA APPARATUS USING THE SAME

(75) Inventors: Joong Hee Lee, Seongnam-si (KR); Young Ho Han, Suwon-si (KR); Il Jeong Park, Suwon-si (KR)

(73) Assignees: Samsung Electronics Co, Ltd., Suwon-si (KR); SUNGKYUNKWAN UNIVERSITY Foundation for Corporate Collaboration, Suwon-si (KR)

( * ) Notice: Subject to any disclaimer, the term of this patent is extended or adjusted under 35 U.S.C. 154(b) by 385 days.

(21) Appl. No.: 12/844,059

(22) Filed: Jul. 27, 2010

(65) Prior Publication Data

US 2011/0025572 A1  Feb. 3, 2011

(30) Foreign Application Priority Data

Jul. 28, 2009  (KR) .................. 10-2009-0068981

(51) Int. Cl.
 *H01Q 1/00* (2006.01)
 *H01F 1/34* (2006.01)
(52) U.S. Cl.
 USPC ...................................... 343/787; 252/62.63
(58) Field of Classification Search
 USPC .......... 343/787, 788; 252/62.63, 62.64, 62.62
 See application file for complete search history.

(56) References Cited

U.S. PATENT DOCUMENTS

| | | | |
|---|---|---|---|
| 6,358,432 B1 * | 3/2002 | Tomono et al. ............ | 252/62.63 |
| 6,623,879 B2 | 9/2003 | Okano et al. | |
| 6,660,179 B2 | 12/2003 | Umeda et al. | |
| 6,669,861 B2 * | 12/2003 | Marusawa ................. | 252/62.63 |
| 6,858,156 B2 | 2/2005 | Takami et al. | |
| 7,169,319 B2 | 1/2007 | Takami et al. | |
| 7,425,280 B2 * | 9/2008 | Nagaoka et al. ........... | 252/62.63 |
| 7,651,626 B2 * | 1/2010 | Gonda et al. ............... | 252/62.63 |
| 7,764,143 B2 * | 7/2010 | Miyata et al. ................ | 333/185 |
| 7,910,214 B2 | 3/2011 | Kimura et al. | |
| 2003/0148147 A1 | 8/2003 | Okano et al. | |

FOREIGN PATENT DOCUMENTS

| | | |
|---|---|---|
| CN | 1380663 A | 11/2002 |
| CN | 1426383 A | 6/2003 |
| CN | 1530971 A | 9/2004 |
| CN | 101014548 A | 8/2007 |
| CN | 101262085 A | 9/2008 |
| JP | 2002-260912 * | 9/2002 |
| KR | 10-2002-0079484 A | 10/2002 |
| KR | 10-2005-0050681 A | 5/2005 |
| KR | 10-2007-0107654 A | 11/2007 |
| KR | 10-2008-0082466 A | 9/2008 |

* cited by examiner

*Primary Examiner* — Hoang V Nguyen
(74) *Attorney, Agent, or Firm* — Jefferson IP Law, LLP (57) ABSTRACT

A method of making Y-type hexagonal ferrite and an antenna using the same are provided. Y-type hexagonal ferrite includes a base ferrite composed of iron oxide, barium carbonate and cobalt oxide, and silicate glass ranging from 0.5 to 5 weight percent added to 100 weight percent of base ferrite. An antenna apparatus includes a magnetic carrier and an antenna pattern formed thereon. The magnetic carrier is formed of such Y-type hexagonal ferrite, and the antenna pattern resonates in a specific frequency band when electric power is supplied. To fabricate the Y-type hexagonal ferrite, a calcination process is performed in which iron oxide, barium carbonate and cobalt oxide are combined into base ferrite at a given calcination temperature after being mixed. A sintering process is performed to sinter the base ferrite and the silicate glass at a given sintering temperature which is lower than the calcination temperature after adding the silicate glass to the base ferrite.

8 Claims, 10 Drawing Sheets

Y-TYPE HEXAGONAL FERRITE, FABRICATION METHOD THEREOF, AND ANTENNA APPARATUS USING THE SAME

PRIORITY

This application claims the benefit under 35 U.S.C. §119 (a) of a Korean patent application filed on Jul. 28, 2009 in the Korean Intellectual Property Office and assigned Serial No. 10-2009-0068981, the entire disclosure of which is hereby incorporated by reference.

BACKGROUND OF THE INVENTION

1. Field of the Invention

The present invention relates to an antenna used in a communication terminal. More particularly, the present invention relates to Y-type hexagonal ferrite, a method for fabricating the Y-type hexagonal ferrite, and an antenna apparatus using the Y-type hexagonal ferrite.

2. Description of the Related Art

Current wireless communication systems provide a variety of multimedia services including Global Positioning System (GPS) based services, Bluetooth based services, Internet related services, and the like. In order to favorably offer such services, data transmission at a high rate is required to support the great volume of multimedia data. One way to meet the above requirement is to improve the performance of an antenna used in communication terminals.

According to market demands for improved mobility or portability of communication terminals, there is growing tendency to make such terminals smaller, thinner, lighter, and more multifunctional. In view of the above, a traditional antenna that projects from the body of a mobile terminal may unfavorably affect portability and is very susceptible to external shock or impact. Therefore, most antennas developed recently are embedded in terminals, namely, fabricated in the form of what is called "intenna." In this case, an antenna is formed using a circuit pattern on a dielectric carrier having a high dielectric constant. An advantage of such antennas is their reduced size.

However, since the antenna is fabricated on the basis of a dielectric material with high dielectric constant, its resonance frequency band may be comparatively narrow. One method known to extend the bandwidth is simply increasing the circuit pattern of the antenna which, in this case, would also cause the dielectric carrier to increase in size. However, this causes a dilemma between a desired broader bandwidth and a desired smaller size of antenna.

SUMMARY OF THE INVENTION

An aspect of the present invention is to address at least the above-mentioned problems and/or disadvantages and to provide at least the advantages described below. Accordingly, an aspect of the present invention is to provide an antenna having a broader bandwidth without sacrificing the size of the antenna.

In accordance with an aspect of the present invention, a method for fabricating Y-type hexagonal ferrite is provided. The method includes mixing iron oxide, barium carbonate and cobalt oxide, calcinating the mixed iron oxide, barium carbonate and cobalt oxide for combination into a base ferrite at a given calcination temperature, and sintering the base ferrite and the silicate glass at a given sintering temperature after adding the silicate glass to the base ferrite, wherein the sintering temperature is lower than the calcination temperature.

In an exemplary implementation, the sintering temperature may range from 1000° C. to 1180° C.

In accordance with another aspect of the present invention, a composition of Y-type hexagonal ferrite is provided. The composition includes a base ferrite composed of iron oxide, barium carbonate, and cobalt oxide, and a silicate glass added to the base ferrite. In an exemplary implementation, the silicate glass ranges from 0.5 to 5 weight percent and is added to 100 weight percent of said base ferrite.

In an exemplary implementation, the silicate glass may contain silicon dioxide with 60~100 weight percent, boron oxide with 0~20 weight percent, lithium oxide with 0~10 weight percent, potassium oxide with 0~5 weight percent, sodium oxide with 0~5 weight percent, and barium oxide with 0~5 weight percent.

In accordance with still another aspect of the present invention, an antenna apparatus using Y-type hexagonal ferrite is provided. The antenna apparatus includes a magnetic carrier formed of Y-type hexagonal ferrite including a base ferrite composed of iron oxide, barium carbonate and cobalt oxide, and a silicate glass added to the base ferrite, and an antenna pattern formed on a surface of the magnetic carrier and resonating in a specific frequency band when electric power is supplied. In an exemplary implementation, the magnetic carrier includes the silicate glass ranging from 0.5 to 5 weight percent added to 100 weight percent of said base ferrite.

In such an antenna apparatus, the frequency band may range from 0 Hz to 5 GHz, and at least one of the permeability and the dielectric permittivity of the magnetic carrier may be maintained when the antenna pattern resonates.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3A to 6B are graphs illustrating characteristics of an antenna apparatus according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In accordance with an exemplary embodiment of the present invention, Y-type hexagonal ferrite is a kind of magnetic substance and composed of base ferrite ($Ba_2Co_2Fe_{12}O_{22}$) and silicate glass. In this Y-type hexagonal ferrite, base ferrite is a main ingredient, and silicate glass is added thereto. When the weight percent (WT %) of base ferrite is 100, the weight percent of silicate glass may range from 0.5 to 5. Additionally, Y-type hexagonal ferrite has a density of more than $4.6 \times 10^3$ $kg/m^3$ and also has a high solidity.

Base ferrite is composed of iron oxide ($Fe_2O_3$), barium carbonate ($BaCO_3$), and cobalt oxide ($Co_3O_4$ or CoO). Specifically, 100 weight percent of base ferrite contains iron oxide with 59~60 weight percent, barium carbonate with 20~20.5 weight percent, and cobalt oxide with 20~20.5 weight percent.

Silicate glass is composed of at least one of silicon dioxide ($SiO_2$), boron oxide ($B_2O_3$), lithium oxide ($Li_2O$), potassium oxide ($K_2O$), sodium oxide ($Na_2O$), and barium oxide (BaO). Specifically, 100 weight percent of silicate glass contains silicon dioxide with 60~100 weight percent, boron oxide with 0~20 weight percent, lithium oxide with 0~10 weight percent, potassium oxide with 0~5 weight percent, sodium oxide with 0~5 weight percent, and barium oxide with 0~5 weight percent.

For example, 100 weight percent of silicate glass may contain silicon dioxide with 65 weight percent, boron oxide with 20 weight percent, lithium oxide with 7 weight percent, potassium oxide with 5 weight percent, and barium oxide with 3 weight percent. Alternatively, 100 weight percent of silicate glass may contain silicon dioxide with 65 weight percent, boron oxide with 20 weight percent, lithium oxide with 7 weight percent, sodium oxide with 5 weight percent, and barium oxide with 3 weight percent. In some cases, silicate glass may be silica glass or fumed silica glass, containing silicon dioxide with 100 weight percent. Here, silicate glass may be classified into silica glass and fumed silica glass according to a composition form or the specific surface area of particles. Normally, silica glass is formed of micron-sized particles, whereas fumed silica glass is formed of nano-sized particles.

Figure 1:
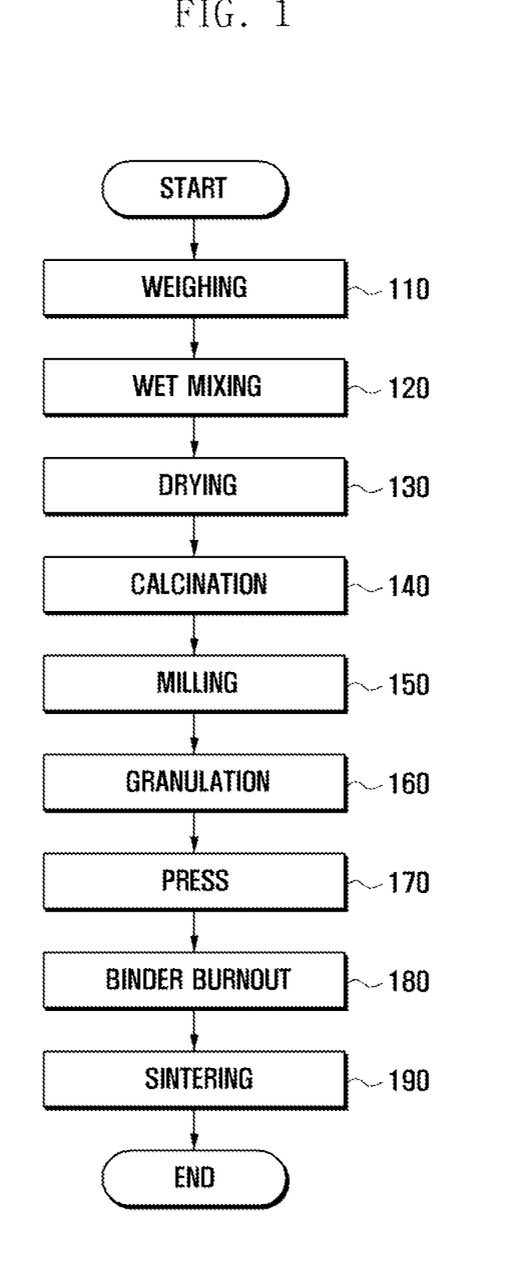
FIG. 1 is a flowchart illustrating a method for fabricating Y-type hexagonal ferrite according to an exemplary embodiment of the present invention.

FIG. 1 is a flowchart illustrating a method for fabricating Y-type hexagonal ferrite according to an exemplary embodiment of the present invention.

Referring to FIG. 1, ingredients of which Y-type hexagonal ferrite is composed are weighed in step 110. Through the weighing process, 60 weight percent of iron oxide, 20 weight percent of barium carbonate, and 20 weight percent of cobalt oxide are prepared respectively. In addition, for the total weight percent of iron oxide, barium carbonate and cobalt oxide, 0.5~5 weight percent of silicate glass is prepared. Here, for 100 weight percent of silicate glass, respectively prepared are 60~100 weight percent of silicon dioxide, 0~20 weight percent of boron oxide, 0~10 weight percent of lithium oxide, 0~5 weight percent of potassium oxide, 0~5 weight percent of sodium oxide, and 0~5 weight percent of barium oxide.

In step 120, iron oxide, barium carbonate and cobalt oxide are mixed together using a wet mixing process. More specifically, iron oxide, barium carbonate and cobalt oxide are crushed into powders through a high-speed rotation of about 200 Revolution Per Minute (RPM) in a planetary mill and then mixed with a suitable solvent. In an exemplary implementation, the wet mixing process may be carried out for about three hours.

In step 130, iron oxide, barium carbonate and cobalt oxide are subjected to a drying process in which they are dried in an oven. A solvent is removed in this step. In an exemplary implementation, a drying temperature and drying time are approximately 120° C. and about twelve hours, for example, respectively.

In step 140, iron oxide, barium carbonate, and cobalt oxide are subjected to a calcination process and combined into base ferrite. More specifically, this step physically or chemically changes iron oxide, barium carbonate and cobalt oxide, removes impurities therefrom, and forms base ferrite. A solid-phase reaction may be used to combine iron oxide, barium carbonate and cobalt oxide. In an exemplary implementation, calcination temperature and time are approximately 1200~1300° C. and about two hours, for example, respectively.

In step 150, silicate glass is added to base ferrite as part of a milling process. More specifically, base ferrite and silicate glass are crushed into powders through a high-speed rotation of about 200 RPM in a planetary mill and then mixed together. In an exemplary implementation, milling time is about three hours, for example.

In step 160, base ferrite and silicate glass adhere to each other through a granulation process. Bonds thereof may be formed by using a binder such as Poly Vinyl Alcohol (PVA). For the total weight percent of base ferrite and silicate glass, 7 weight percent of PVA may be added.

In step 170, base ferrite and silicate glass are compressed together through a press process. Here, base ferrite and silicate glass make a desired form with a controlled density. In an exemplary implementation, a pressure of about 1 $ton/cm^2$ may be applied to base ferrite, silicate glass and a binder.

In step 180, a binder is removed from base ferrite and silicate glass using a binder burnout process. In an exemplary implementation, process temperature and time are approximately 450° C. and about four hours, for example, respectively.

In step 190, base ferrite and silicate glass are sintered to further adhere the base ferrite and silicate glass to each other. Through sintering, the base ferrite and silicate glass have a density of $4.6 \times 10^3$ $kg/m^3$ or more, for example. A sintering process is carried out at a regular temperature. This sintering temperature should be lower than the aforesaid calcination temperature and thus ranges from 1000° C. to 1180° C. In an exemplary implementation, a sintering temperature may be 1090~1110° C. Sintering time is about two hours, for example.

Figure 2:
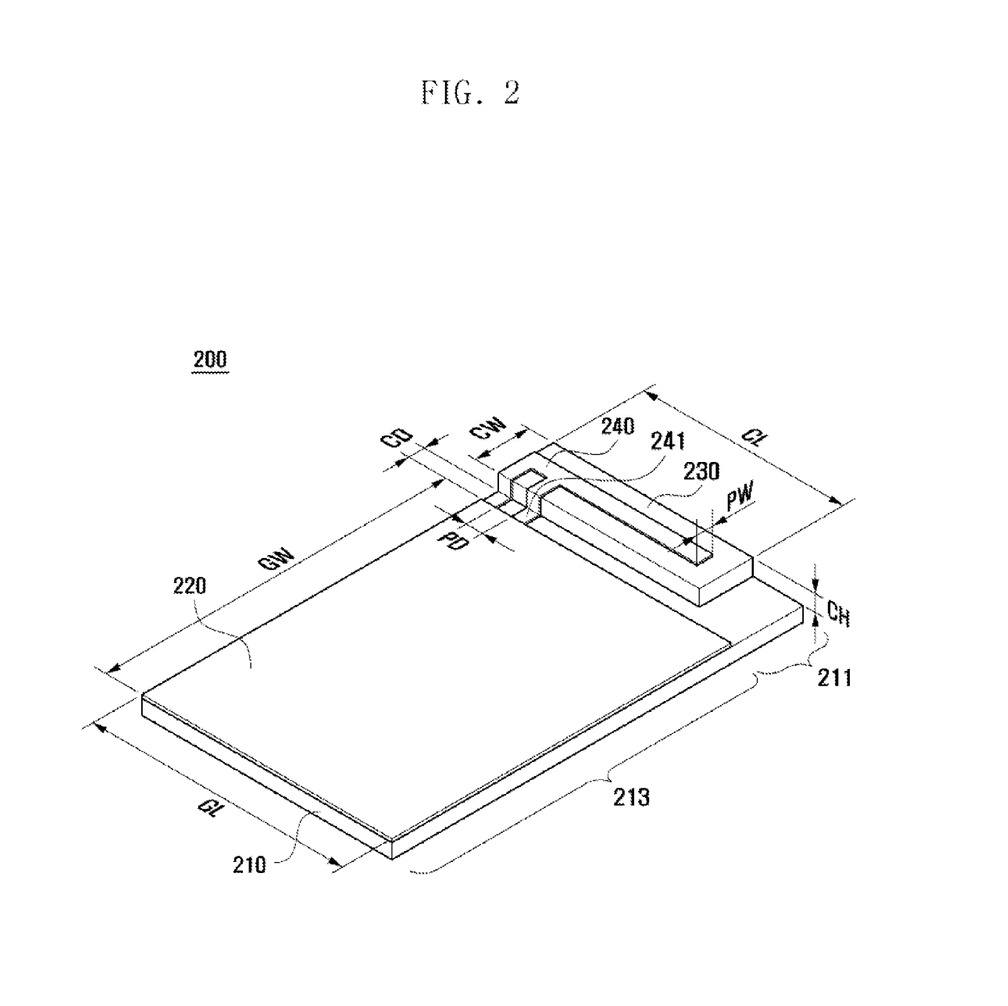
FIG. 2 is a perspective view illustrating an antenna apparatus using Y-type hexagonal ferrite according to an exemplary embodiment of the present invention.

FIG. 2 is a perspective view illustrating an antenna apparatus using Y-type hexagonal ferrite accord to an exemplary embodiment of the present invention. Additionally, FIGS. 3A to 6B are graphs illustrating characteristics of an antenna apparatus according to exemplary embodiments of the present invention. The following examples are based on the assumption that the antenna apparatus is made in the form of a Printed Circuit Board (PCB).

Referring to FIG. 2, the antenna apparatus 200 includes a board body 210, a ground layer 220, a magnetic carrier 230, and an antenna pattern 240.

The board body 210 provides a supportable base of the antenna apparatus 200. Normally, the board body 210 has a flat structure with at least four corners and is formed chiefly of a dielectric material. The upper surface of the board body 210 is divided into an antenna region 211 and a ground region 213. The antenna region 211 may be disposed to occupy at least two corners of the board body 210. Additionally, the board body 210 may have a feed region on the lower surface.

The ground layer 220 is provided for grounding of the antenna apparatus 200. The ground layer 220 is formed in the ground region 213 of the board body 210, and may be formed to cover the ground region 213.

The magnetic carrier 230 is provided for the improvement and maintenance of performance of the antenna apparatus 200. More particularly, the magnetic carrier 230 is formed of Y-type hexagonal ferrite which is discussed above. In an exemplary implementation, the magnetic carrier 230 has a flat structure with a certain thickness. In addition, the magnetic carrier 230 may be disposed in and attached to the antenna region 211 on the upper surface of the board body 210.

The antenna pattern 240 is provided for an actual operation of the antenna apparatus 200. In an exemplary implementation, the antenna pattern 240 may be formed of a conductive material including at least one of silver (Ag), palladium (Pd), platinum (Pt), copper (Cu), gold (Au), nickel (Ni), and the like, on be formed on a surface of the magnetic carrier 230. Here, the antenna pattern 240 may be formed through a conventional patterning process such as printing, plating, deposition, sputtering, and the like. Furthermore, the antenna pattern 240 has a feed point 241 near the ground layer 220 and is extended from the feed point 241 to have a specific shape. The feed point 241 may penetrate the board body 210 and reach the lower surface of the board body 210.

According to an exemplary embodiment of the present invention, the antenna pattern 240 may be composed of at least one parallel component circuit and at least one perpendicular component circuit, which are connected to and distinguished from each other by at least one bent portion. For example, the antenna pattern 240 may be formed as a particular type of transmission line such as a meander type, a spiral type, a step type, a loop type, and so forth. Also, the antenna pattern 240 may be designed in the form of an Inverted L Antenna (ILA), an Inverted F Antenna (IFA), a monopole antenna, etc.

The antenna apparatus 200 transmits and receives signals in a predefined frequency band. Namely, when electric power is supplied through the feed point 241, the antenna pattern 240 resonates in a specific frequency band and thereby passes signals. Here, a resonance frequency band of the antenna pattern 240 may be selected from 0 Hz to 5 GHz and also adjusted depending on the size, shape, etc. of the antenna pattern 240.

The characteristics of the antenna apparatus 200 may depend on the size of the magnetic carrier 230. That is, a frequency band for resonance of the antenna pattern 240 may be adjusted according to the size of the magnetic carrier 230. For example, as the magnetic carrier 230 is formed to have a smaller size, the antenna pattern 240 can resonate in a higher frequency band.

Figure 3A:
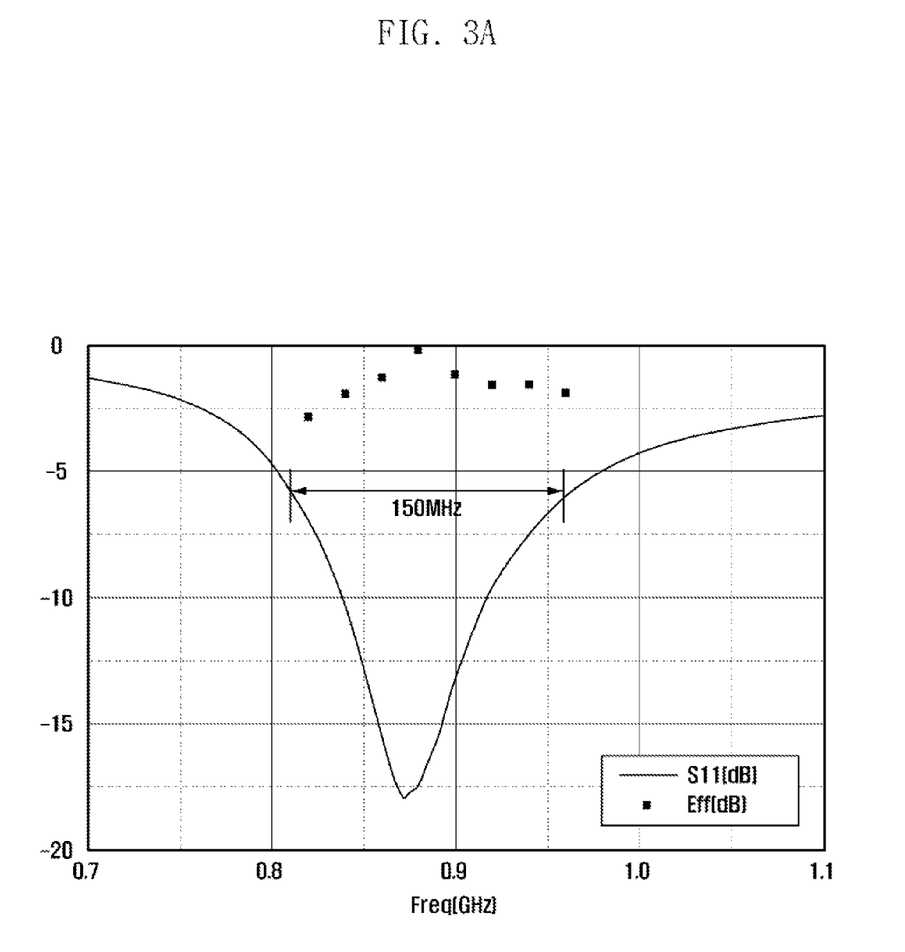

In one example, the magnetic carrier 230 has a length (CL), a width (CW) and a thickness (CH) of 40 mm, 5 mm and 5 mm, respectively. In addition, a distance (CD) between the ground layer 220 and the magnetic carrier 230 is 3 mm. Also, in the Inverted F Antenna (IFA) structure, the antenna pattern 240 has a width (PW) of 2 mm and a distance (PD) of 3 mm between a feed circuit and a short circuit. Furthermore, the ground layer 220 has a length (GL) of 90 mm and a width (GW) of 50 mm In this case, the antenna apparatus 200 has characteristics as shown in FIG. 3A. Namely, the antenna apparatus 200 resonates in a frequency band of 820~960 MHz with a bandwidth of about 150 MHz. Here, the antenna apparatus 200 has a radiation intensity of 52~99% with a 71% average in a frequency band of 820~960 MHz.

Figure 3B:
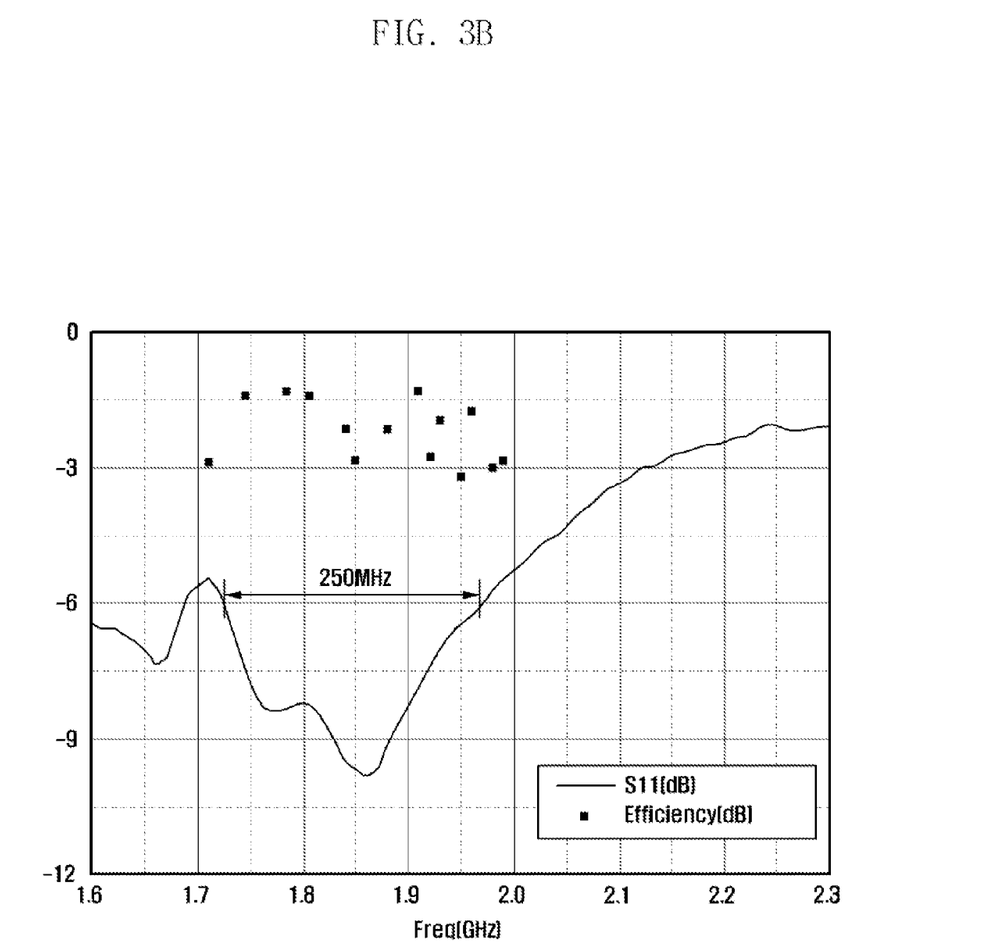

In another example, the magnetic carrier 230 has a length (CL), a width (CW) and a thickness (CH) of 15 mm, 5 mm and 5 mm, respectively. In addition, a distance (CD) between the ground layer 220 and the magnetic carrier 230 is 3 mm. Also, in the Inverted F Antenna (IFA) structure, the antenna pattern 240 has a width (PW) of 2 mm and a distance (PD) of 3 mm between a feed circuit and a short circuit. Furthermore, the ground layer 220 has a length (GL) of 90 mm and a width (GW) of 50 mm In this case, the antenna apparatus 200 has characteristics as shown in FIG. 3B. Namely, the antenna apparatus 200 resonates in a frequency band of 1710~1990 MHz with a bandwidth of about 250 MHz. Here, the antenna apparatus 200 has a radiation intensity of 33~79% with a 59% average in a frequency band of 1710~1990 MHz.

Additionally, when the antenna pattern 240 resonates between 0 Hz and 5 GHz, at least one of the permeability (mu, mu', mu") and the dielectric permittivity (epsilon, epsilon', epsilon") of the magnetic carrier 230 is maintained in a certain range. Here, as the permeability of the magnetic carrier 230 is maintained, the loss rate of the magnetic carrier 230 is suppressed between 0 Hz and 5 GHz. In other words, the magnetic carrier 230 has a low loss rate when the antenna pattern 240 resonates, and Y-type hexagonal ferrite of the magnetic carrier 230 has high frequency properties. These high frequency properties may depend on ingredients, especially silicate glass, of Y-type hexagonal ferrite.

As shown in Table 1, high frequency properties may be similar regardless of at least one factor (i.e., an added ingredient, an added amount, and a sintering temperature) related to silicate glass in Y-type hexagonal ferrite. In Table 1, glass A refers to silicate glass which contains silicon dioxide with 65 weight percent, boron oxide with 20 weight percent, lithium oxide with 7 weight percent, potassium oxide with 5 weight percent, and barium oxide with 3 weight percent. In addition, glass B refers to silica glass, and glass C refers to fumed silica glass.

TABLE 1

| Example | | | | | | |
| --- | --- | --- | --- | --- | --- | --- |
| Added Ingredient | Added Amount (WT %) | Sintering Temp. (° C.) | Average in 1~6 GHz | | | |
| | | | $\mu'$ | $\mu''$ | $\epsilon'$ | $\epsilon''$ |
| Glass A | 0 | 1210 | 2.49 | 0.70 | 6.98 | 0.19 |
| Glass A | 1 | 1060 | 1.59 | 0.23 | 6.29 | 0.06 |
| Glass A | 1 | 1080 | 1.69 | 0.20 | 6.24 | 1.56 |
| Glass A | 1 | 1100 | 1.73 | 0.09 | 6.57 | 0.57 |
| Glass A | 1 | 1180 | 1.91 | 0.14 | 8.36 | 1.08 |
| Glass B | 1 | 1100 | 1.63 | 0.30 | 6.58 | 0.07 |
| Glass C | 1 | 1100 | 1.54 | 0.19 | 5.54 | 0.03 |
| Glass A | 5 | 1030 | 1.33 | 0.17 | 6.12 | 0.03 |
| Glass C | 5 | 1100 | 1.49 | 0.16 | 6.68 | 0.54 |

In one example, for the total weight percent of iron oxide, barium carbonate and cobalt oxide, 1 weight percent of glass A is prepared. Then iron oxide, barium carbonate and cobalt oxide are combined together into base ferrite at a calcination temperature of 1200° C. Additionally, in a milling process, glass A is added. Thereafter, by sintering both base ferrite and glass A at a sintering temperature of 1100° C., Y-type hexagonal ferrite using glass A is fabricated. Meanwhile, under the same conditions as in the case of glass A regarding an added amount, a calcination temperature, a sintering temperature, etc., Y-type hexagonal ferrite using each of glass B and glass C is fabricated.

Figure 4A:
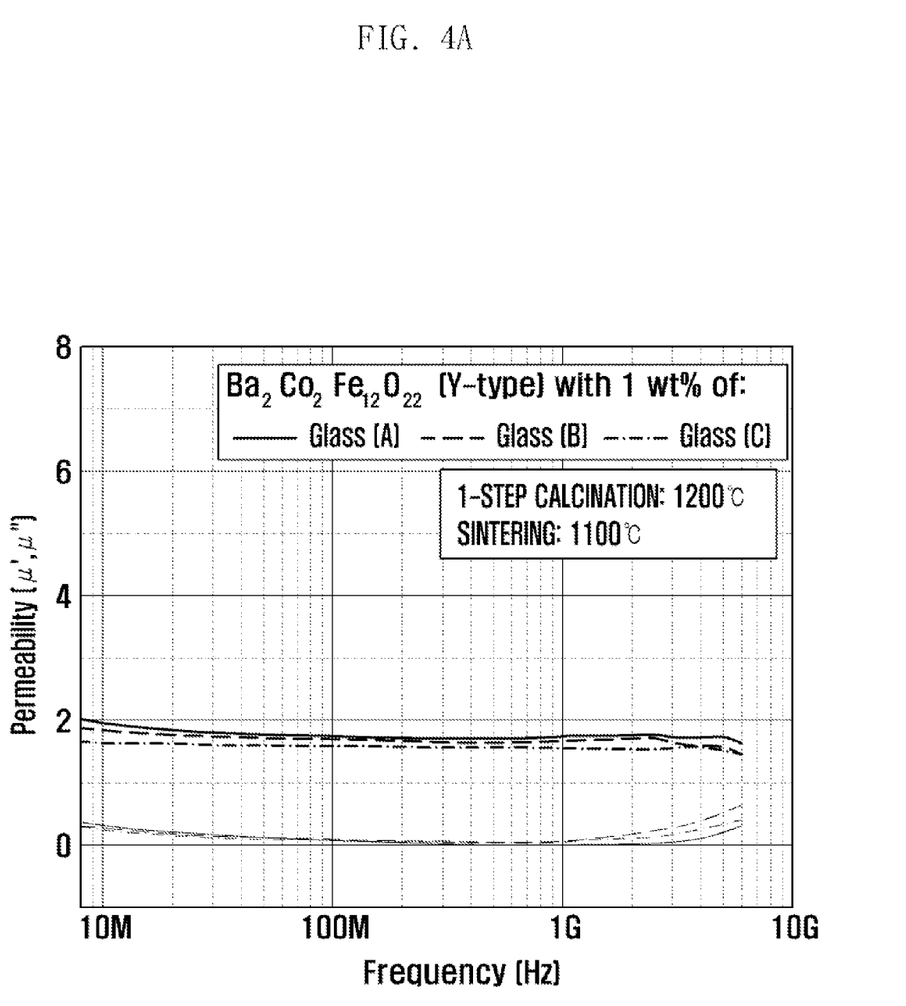

When the antenna apparatus 200 using Y-type hexagonal ferrite with each of glass A, B and C is in operation, the permeability of the magnetic carrier 230 using any of glass A, B and C is similar as shown in FIG. 4A. In addition, this permeability is nearly maintained without extreme fluctuations from 0 Hz to 10 GHz.

Figure 4B:
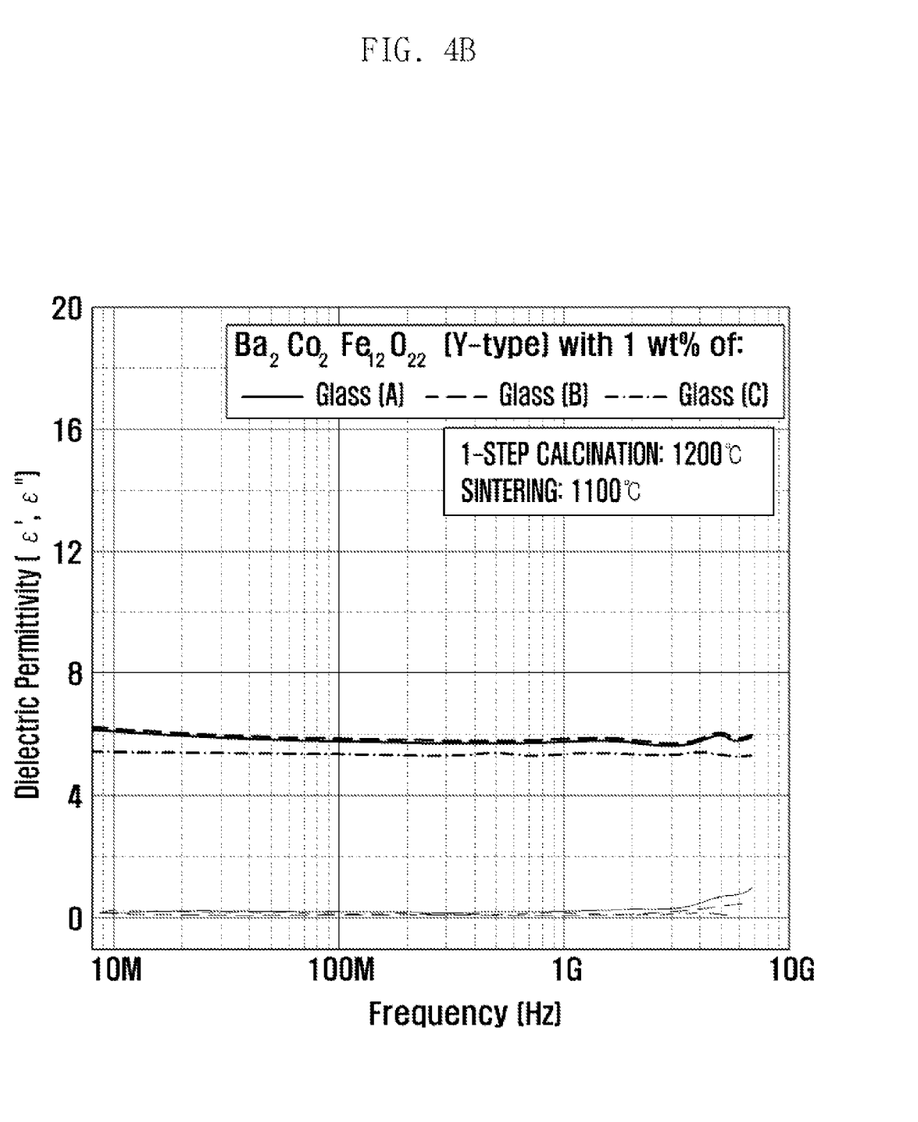

Also, when the antenna apparatus 200 using Y-type hexagonal ferrite with each of glass A, B and C is in operation, the dielectric permittivity of the magnetic carrier 230 using any of glass A, B and C is similar as shown in FIG. 4B. In addition, this dielectric permittivity is nearly maintained without extreme fluctuations from 0 Hz to 10 GHz.

In another example, for the total weight percent of iron oxide, barium carbonate and cobalt oxide, 5 weight percent of glass A is prepared. Iron oxide, barium carbonate and cobalt oxide are combined together into base ferrite at a calcination temperature of 1200° C. Additionally, in a milling process, glass A is added. Thereafter, by sintering both base ferrite and glass A at a sintering temperature of 1030° C., Y-type hexagonal ferrite using glass A is fabricated. Separately, for the total weight percent of iron oxide, barium carbonate and cobalt oxide, 5 weight percent of glass C is prepared. Iron oxide, barium carbonate and cobalt oxide are combined together into base ferrite at a calcination temperature of 1200° C. Additionally, in a milling process, glass C is added. Thereafter, by sintering both base ferrite and glass C at a sintering temperature of 1100° C., Y-type hexagonal ferrite using glass C is fabricated.

Figure 5A:
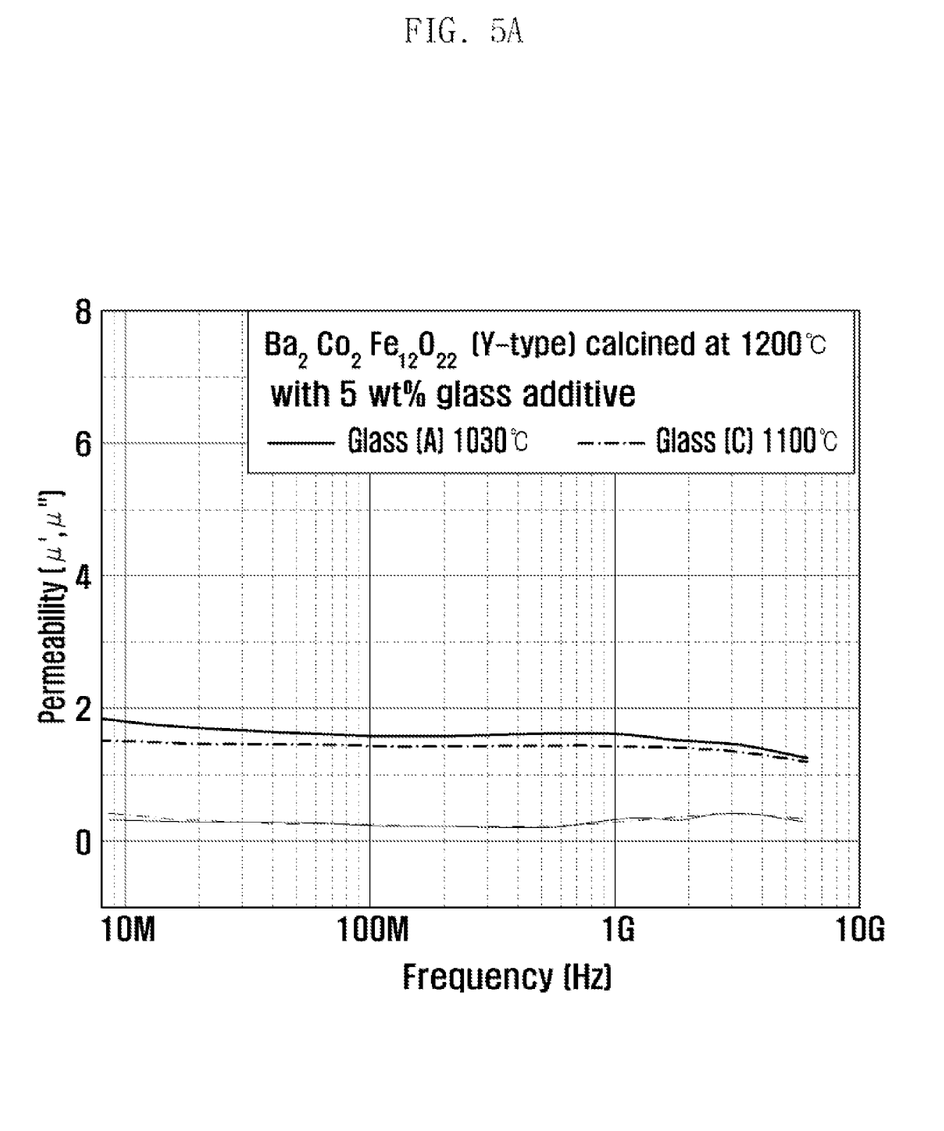

When the antenna apparatus 200 using Y-type hexagonal ferrite with each of glass A and C is in operation, the permeability of the magnetic carrier 230 using either of glass A and C is similar as shown in FIG. 5A. In addition, this permeability is nearly maintained without extreme fluctuations from 0 Hz to 10 GHz.

Figure 5B:
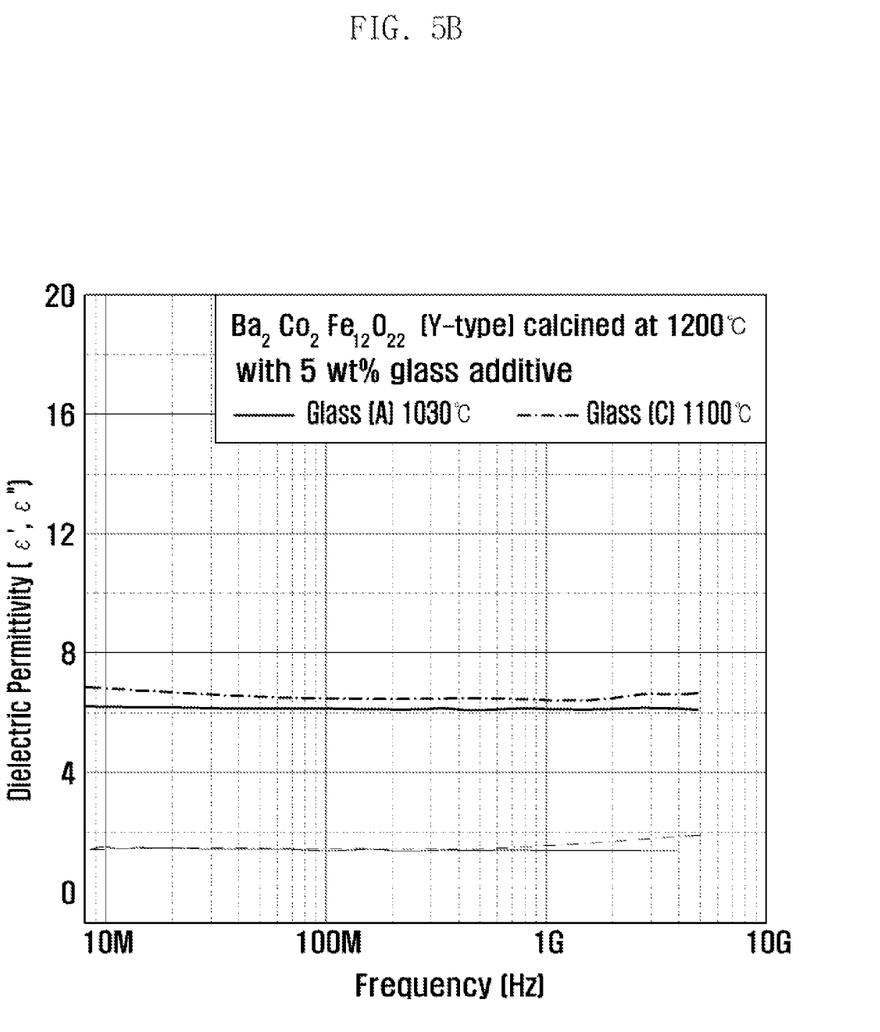

Also, when the antenna apparatus 200 using Y-type hexagonal ferrite with each of glass A and C is in operation, the dielectric permittivity of the magnetic carrier 230 using either of glass A and C is similar as shown in FIG. 5B. In addition, this dielectric permittivity is nearly maintained without extreme fluctuations from 0 Hz to 10 GHz.

In other words, high frequency properties of Y-type hexagonal ferrite are determined depending on ingredients, especially silicate glass. However, a bandwidth in which the permeability or dielectric permittivity of the magnetic carrier 230 is maintained may be varied according to a sintering temperature of Y-type hexagonal ferrite.

In another example, for the total weight percent of iron oxide, barium carbonate and cobalt oxide, 1 weight percent of glass A is prepared. Iron oxide, barium carbonate and cobalt oxide are combined together into base ferrite at a calcination temperature of 1200° C. Additionally, in a milling process, glass A is added. Thereafter, by sintering both base ferrite and glass A at a sintering temperature of 1060° C., Y-type hexagonal ferrite is fabricated. Meanwhile, under the same conditions regarding an added amount, a calcination temperature, etc., Y-type hexagonal ferrite is fabricated after sintering it at respective sintering temperatures of 1080° C., 1100° C. and 1180° C.

Figure 6A:
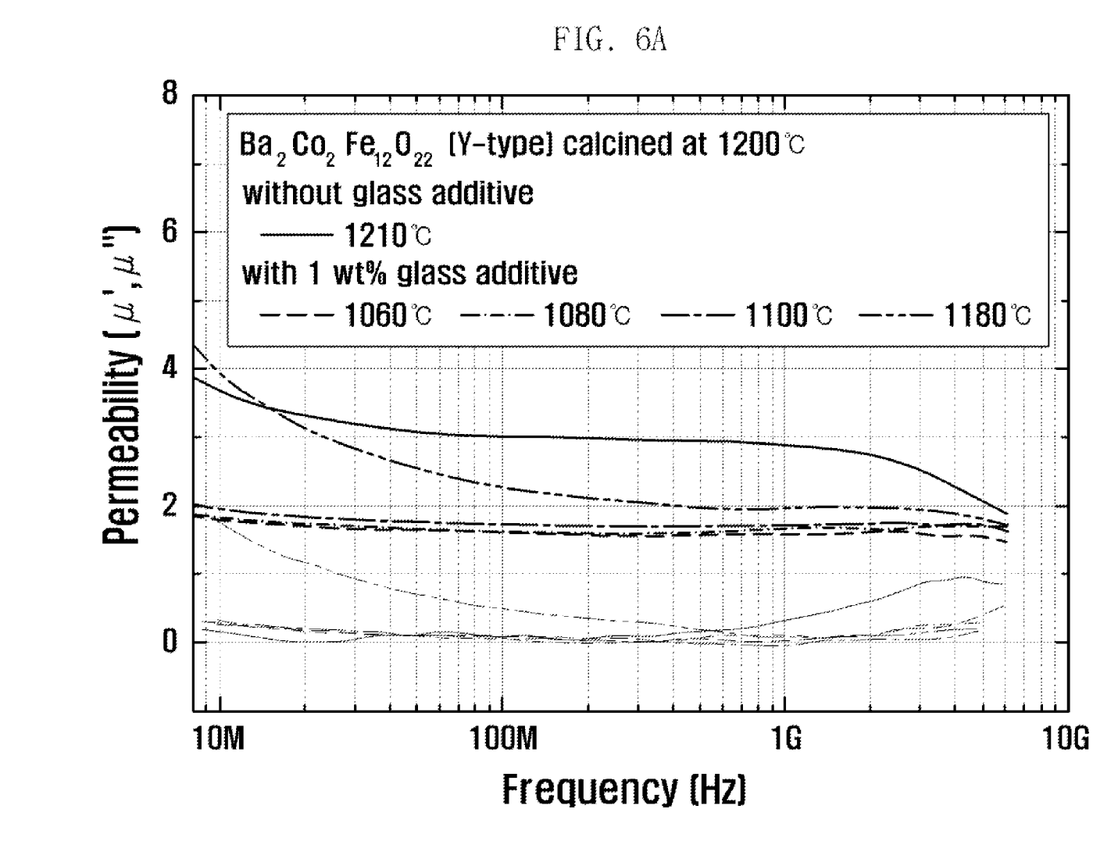

When the antenna apparatus 200 using Y-type hexagonal ferrite is in operation, magnetic carriers 230 sintered respectively at temperatures of 1060° C., 1080° C., 1100° C. and 1180° C. differ somewhat in terms of permeability as shown in FIG. 6A. Furthermore, these magnetic carriers exhibit greater distinction in terms of permeability as compared to other magnetic carriers sintered at a temperature of 1210° C. without glass additive. In addition, the permeability of the magnetic carriers 230 sintered respectively at temperatures of 1060° C., 1080° C., 1100° C. and 1180° C. are nearly maintained without extreme fluctuations from 0 Hz to 10 GHz.

Figure 6B:
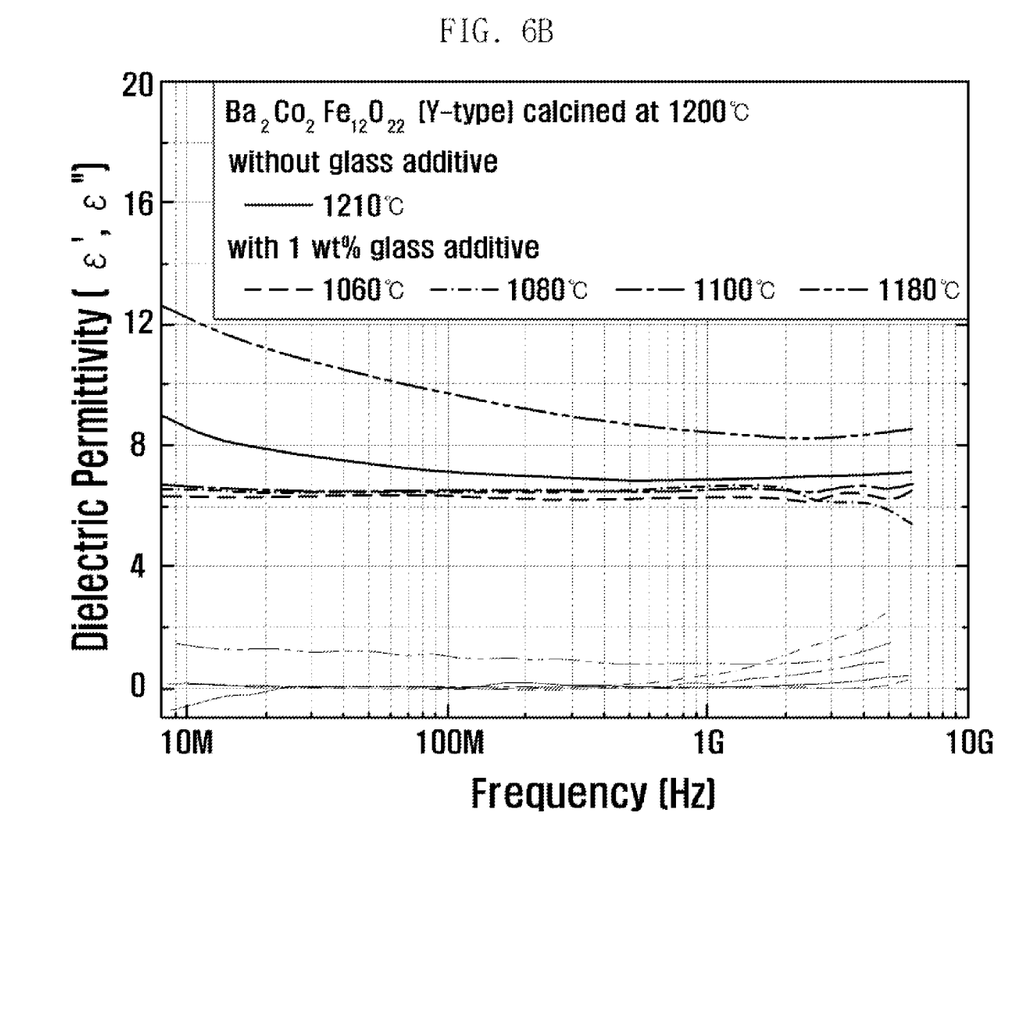

Meanwhile, when the antenna apparatus 200 using Y-type hexagonal ferrite is in operation, the magnetic carriers 230 sintered respectively at temperatures of 1060° C., 1080° C., 1100° C. and 1180° C. differ somewhat from each other in terms of dielectric permittivity as shown in FIG. 6B. Furthermore, these magnetic carriers exhibit greater distinction in terms of dielectric permittivity as compared to other magnetic carriers sintered at a temperature of 1210° C. without glass additive. In addition, the dielectric permittivity of the magnetic carriers 230 sintered respectively at temperatures of 1060° C., 1080° C., 1100° C. and 1180° C. are nearly maintained without extreme fluctuations from 0 Hz to 10 GHz.

As discussed above, exemplary embodiments of the present invention realize an antenna apparatus using Y-type hexagonal ferrite in which silicate glass is added to base ferrite, so that it may promote an increase in bandwidth of a frequency band available for the antenna apparatus. This is in virtue of high frequency properties of Y-type hexagonal ferrite which can suppress the loss rate caused by operation of the antenna apparatus in an extended bandwidth. Namely, this is because the permeability of Y-type hexagonal ferrite is nearly maintained within a certain range from at least 0 Hz to 5 GHz while the antenna apparatus is in operation. Therefore, although the antenna apparatus is not increased in size, the antenna apparatus can employ a greater bandwidth. In other words, it is possible to realize a broader bandwidth without sacrificing a smaller size in the antenna apparatus.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A composition of Y-type hexagonal ferrite, the composition comprising:
    a base ferrite composed of iron oxide, barium carbonate, and cobalt oxide, and
    a silicate glass added to the base ferrite,
    wherein the silicate glass comprises silicon dioxide with 65 weight percent, boron oxide with 20 weight percent, lithium oxide with 7 weight percent, one of potassium oxide and sodium oxide with 5 weight percent, and barium oxide with 3 weight percent.

2. The composition of claim 1, wherein the silicate glass ranges from 0.5 to 5 weight percent and is added to 100 weight percent of the base ferrite.

3. The composition of claim 2, wherein the base ferrite comprises iron oxide with 60 weight percent, barium carbonate with 20 weight percent, and cobalt oxide with 20 weight percent.

4. The composition of claim 1, wherein the silicate glass comprises one of silica glass and fumed silica glass.

5. An antenna apparatus including Y-type hexagonal ferrite, the apparatus comprising:
- a magnetic carrier formed of Y-type hexagonal ferrite including a base ferrite composed of iron oxide, barium carbonate and cobalt oxide, and a silicate glass added to the base ferrite; and
- an antenna pattern formed on a surface of the magnetic carrier and resonating in a specific frequency band when electric power is supplied,
- wherein the silicate glass comprises silicon dioxide with 65 weight percent, boron oxide with 20 weight percent, lithium oxide with 7 weight percent, one of potassium oxide and sodium oxide with 5 weight percent, and barium oxide with 3 weight percent.

6. The apparatus of claim 5, wherein the silicate glass ranges from 0.5 to 5 weight percent and is added to 100 weight percent of the base ferrite.

7. The apparatus of claim 5, wherein the frequency band ranges from 0Hz to 5GHz, and wherein at least one of the permeability and the dielectric permittivity of the magnetic carrier is maintained when the antenna pattern resonates.

8. The apparatus of claim 5, wherein the silicate glass comprises one of silica glass and fumed silica glass.

\* \* \* \* \*